United States Patent [19]

Blaise et al.

[11] Patent Number: 4,981,932

[45] Date of Patent: Jan. 1, 1991

[54] FLUORATED IONIC POLYMER, METHOD FOR ITS PREPARATION AND MEMBRANES

[75] Inventors: Jean Blaise; Michel Jaccaud; Charles Laviron, all of Lyons; Henri Mathais, Saint-Didier Mont D'Or; Dominique Ravier, Lyons; Francis Leroux, Brignals, all of France

[73] Assignee: Atochem, Puteaux, France

[21] Appl. No.: 170,693

[22] Filed: Mar. 14, 1988

Related U.S. Application Data

[63] Continuation of Ser. No. 858,187, filed as PCT FR85/00185 on Jul. 3, 1985, published as WO86/00624 on Jan. 30, 1986, abandoned.

[30] Foreign Application Priority Data

Jul. 13, 1984 [DE] Fed. Rep. of Germany ....... 8411145
Jun. 20, 1985 [DE] Fed. Rep. of Germany ....... 8509396

[51] Int. Cl.$^5$ .................. C08F 228/02; C08F 230/04; C08F 8/00
[52] U.S. Cl. ............................... 526/243; 210/500.42; 526/240
[58] Field of Search ............................... 526/243, 240; 210/500.27, 500.41, 500.42

[56] References Cited

U.S. PATENT DOCUMENTS

| | | | |
|---|---|---|---|
| 3,528,954 | 9/1970 | Carlson et al. | 526/231 |
| 3,940,916 | 3/1976 | Grot | 57/140 |
| 4,126,588 | 11/1978 | Ukihashi et al. | 521/31 |
| 4,330,654 | 5/1982 | Ezzell | 526/243 |
| 4,341,685 | 7/1982 | Miyake | 524/104 |
| 4,471,076 | 9/1984 | Blickle et al. | 521/33 |

FOREIGN PATENT DOCUMENTS 1391570 1/1965 France .
2041379 12/1979 United Kingdom .

OTHER PUBLICATIONS

NL 8003174, Kogyo, Dec. 1980.

*Primary Examiner*—Christopher Henderson
*Attorney, Agent, or Firm*—Burns, Doane, Swecker & Mathis

[57] ABSTRACT

The invention pertains to a perfluorated ionic polymer. This polymer is prepared starting with polymers presenting carboxylic groupings, these groupings being transformed in reactive entities which are later eliminated.

These membranes are particularly suitable for electrolysis of alkalin halogens.

9 Claims, No Drawings

FLUORATED IONIC POLYMER, METHOD FOR ITS PREPARATION AND MEMBRANES

This application is a continuation of application Ser. No. 858,187, filed as PCT FR85/00185 on Jul. 3, 1985, published as W086/00624 on Jan. 30, 1986, now abandoned.

The invention pertains to novel fluorinated polymers. It also pertains to the method for their preparation and to their applications, especially for the realization of membranes which may be used in cells of electrolysis of alkaline halogens.

These polymers $P_1$ are characterized in that the macromolecular chain includes at least one set of formula:

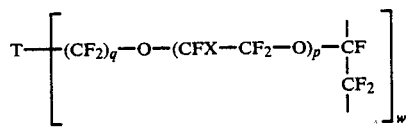    I and sets of formula II an/or sets of formula III

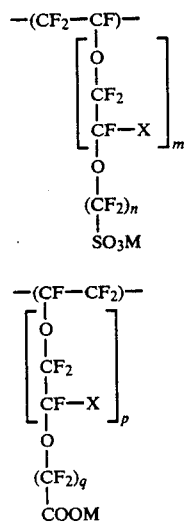

in which:
- w is at least 2 and less than 10
- m and p, which may be different from one set to another may have values from 0 up to 3 included
- n and q, which may be different from one set to another may have values from 1 up to 6 included
- M represents an atom of hydrogen or a monovalent cation
- X represents an atom of fluorine or a perfluorinated alkyl group containing up to 10 carbon atoms
- T represents the a single bond or a perflourinated chain of the formula

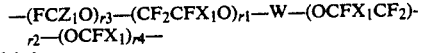

in which:
- $X_1$ represents X or a perflourinated alkyl grouping containing up to 10 carbon and atoms bearing one or some sulfonic and/or carboxylic functions
- W represents a perfluorinated, linear or cyclical, radical containing up to 12 carbon atoms
- r1 and r2 may take individually a value of 0 up to 3 included
- r3 and r4 may take individually the values of 0 or 1.

More particularly, the invention pertains to fluorinated ionic polymers including, in addition to the sets of formula I and the sets of formula II and/or III, sets of formula

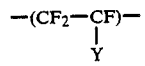    IV in which the symbol Y represents an atom of hydrogen, an atom of chlorine, an atom of fluorine, a perfluorinated alkyl radical or perfluorated alkoxy containing up to 10 carbon atoms.

Preferably, the invention pertains to polymers including set of formula I, II and/or III and optionally IV, in such quantities that the equivalent weight -E.P.- (mass in gram of polymer containing one mole of the exchanging group) of these polymers be comprised between 400 and 10,000. Preferably this equivalent weight is between 200 and 2,000 and, more precisely, between 600 and 1,300. Without leaving the scope of the invention, polymers with equivalent weight higher than 10,000 and which could reach 50,000 or even more, could be prepared.

In the formulas I, II, III, and IV, and preferably, the symbol X represents an atom of fluorine or a $CF_3$ grouping, the symbol Y represents an atom of fluorine, the symbols m and p represent 0 or 1, the symbol n represents 2, 3, 4, or 5 and the symbol q represents 2, 3, 4, or 5.

The invention pertains especially to polymers including the sets of formula:

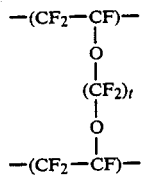    Ia

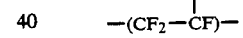

in which t represents a number comprised between 2 and up to 15 included, associated to sets of formula:

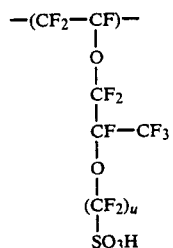    IIa and/or sets of formula

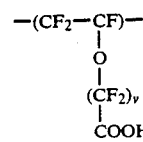    IIIa where u and v represent individually 2, 3, or 4.

According to the invention, and more particularly for a mass of polymer $P_1$ containing an equivalent, it is obvious that the quantities of sets IV cannot exceed PE/100, as well as the quantity of set I cannot exceed PE/294 and that the sum of the quantities of sets II and III is equal to 1, these quantities being expressed in moles.

For an equivalent weight of 1,000 the quantity of each of these sets I to IV will be advantageously taken in the following fields (in moles):

I higher than 0 and lower than or equal to 2.75
II higher than or equal to 0 and lower than or equal to 1
III higher than or equal to 0 and lower than or equal to 1
IV higher than or equal to 0 and lower than or equal to 8.08,
the sum II+III not being nil.

The invention pertains also to a method for preparing polymers including sets of formula I. This method consists in forming a polymer $P_2$ including at least one of the entities of formulas Va optionally associated with to sets of formula Ve- to Vd and to submit this polymer to a treatment allowing for the elimination of the groupings of formulas VIa to VId and obtaining linkages $CF_2$—$CF_2$ within the same set (Va, Va₁) or between two sets (Vb to Vd), the aforementioned formulas defined as follows:

$$T\text{---}\left[\underset{\underset{O}{\|}}{C}\text{--}Z\text{--}Z\text{--}\underset{\underset{O}{\|}}{C}\text{--}(CF_2)_q\text{--}O\text{--}(CFXCF_2\text{--}O)_p\text{--}\underset{\underset{CF_2}{|}}{CF}\right]_w \quad Va$$

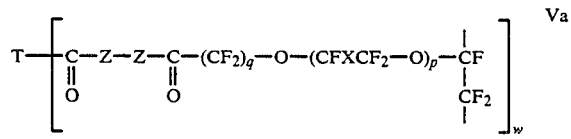

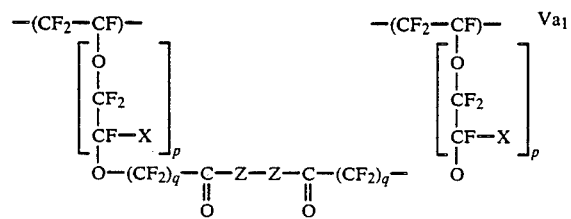

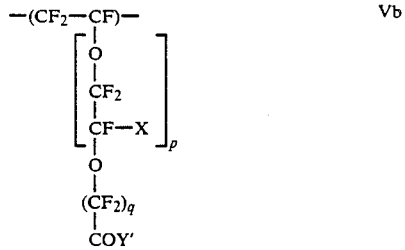

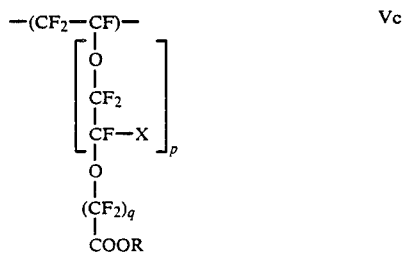

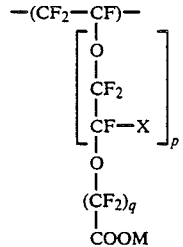

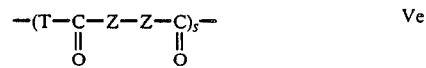

where p, q, M are as defined previously, z represents O, NH or —Z—Z— represent together —O— or —N=N—, Y' represents F, Cl or Br and R represents an alkyl radical having from 1 to 5 carbon atoms; s is at least equal to 1 and, preferably does not exceed 10.

The elimination of the sets VIa to VId may be achieved through various methods: one may use, in particular, a thermal treatment which depending on the nature of these groupings may go up to 100° C. in the case of the VIa groupings or up to 200°-220° C. in the case of the VIc groupings. In the particular case of polymers including moieties of formulas Va or Va₁ in which the Z symbol represents —O—, one may advantageously proceed to the reaction elimination of the VIa groupings, generating $CF_2$ radicals in the presence of a telomerisable unsaturated fluorinated compound or of halogeneous fluorinated olefin.

Among the other methods, we will mention in particular irradiation, for example, with U.V., X, gamma rays, through electronic or neutronic bombarding, the irradiation may be used by itself or associated with other treatments such as the aforementioned thermal treatment. The VIa to VId sets may also be eliminated by means of powerful oxidizing agents such as tetraaetate of lead or through electrochemical reaction such as the Kolbe reaction.

It must be specified that the elimination methods of the VIa to VId sets indicated above are given as illustrations and that using an equivalent method permitting the transformation of the entities Va to Vd into sets of formula I would still be within the scope of the invention.

For obvious reasons, it would not be out of the scope of this invention to prepare polymers including inaddition to the sets I, II, and/or III and optionally IV previously mentioned, sets Va, Va1, Vb, Vc, Vd and/or Ve resulting from an incomplete elimination of the groupings VIa, VIb, VIc and/or VId and/or of the by-products of the elimination of these sets.

Polymers $P_2$ having entities of formulas Va to Ve may themselves be obtained through modifications of the polymers $P_3$ including sets of formula III, eventually associated with other sets such as the sets of formula II and/or the sets of formula IV, in view of obtaining one or the other of the entities Va to Ve. Various techniques may be used for that purpose. In particular, polymers may be formed having Va entities through an action of hydrogen peroxide or of a metallic peroxide or through a hydrazine action (according to the significance of Z). Also $Cl_2$, $PCl_5$, $PCl_3$, $POCl_3$, $PBr_3$, $PBr_5$, $SOCl_2$, eventually followed by a treatment by means of alkaline fluorite to obtain entities with an acyl fluorite grouping Vb.

In this particular case of the obtaining polymers $P_2$ having sets of formula Va (eventually associated with the sets Ve) in which —Z— represents —O—, it is necessary to place the polymer $P_3$ in contact with a compound of formula

    VII before the action of the aforementioned agents.
in which:
T has the significance previously given
G represents OH, F, Cl, I or OR, the R symbol representing an alkyl radical with from 1 to 5 atoms of carbon
w' represents a number between 2 and up to 4 included or with the anhydride of the acid responding to the formula VII.

The sets of the Ve formula may result from the self-condensation of the compound of the aforementioned VII formula.

From the formula VII it appears that the perfluorinated compound may be, in particular, a diacid but the invention applies also to tri- and tetraacids and to all the mixtures containing di-, tri- and/or tetraacids, no matter if the total of the acid functions (or halogen of acyl, or ester) have reacted to give the sets represented in formula I or if one of the part only of these functions have led to these sets I, the chain represented by the T symbol may then contain some free functions, in particular, carboxylic functions as has been specified in the definition of T.

Advantageously, a dioecious perfluorinated alkene acid, can be used which may include some ether bridges and in particular one of the following diacids given here strictly as illustrations:
dioecious perfluoropropane acid
dioecious perfluorobutan acid
trifluoromethyl-2 oxa-3 perfluorooctane dioecious- 1,8
bis(trifluoromethyl)-2,7 dioxa-3,6 perfluorooctane dioecious-1,8
bis(trifluoromethyl)-2,8 dioxa-3,7 perfluorononane dioecious-1,9
bis(trifluoromethyl)-2,9 dioxa-3,8 perfluorodecane dioecious-1,10

The placing into contact of the compound of formula VII or of the anhydride corresponding with the polymer $P_3$ may be done at a temperature which may be between 20° C. and 120° C. The length of contact may go from 1 to 24 hours depending on the temperature. This operation may be performed starting with the compound VII or with a solution of this compound.

Polymers $P_3$ may be prepared according to the known techniques of polymerization of unsaturated fluorinated monomers. In particular, vinylic ethers corresponding to the sets of formula III can be polymerized, as well as vinylic ethers corresponding to the sets of formula II, and depending on the on the case, all or part of the $—SO_3M$ groupings in —COOM groupings may be transformed. It is also possible to transform polymers having $—CO_3M$ and —COOM groupings by copolymerizing the corresponding fluorinated vinylic ethers. Naturally in all these hypotheses, the aforementioned monomers can be polymerized with fluorinated olefin leading to the sets of formula IV. These reactions can be performed by following known techniques and, especially, by working within a chlorofluoroalkane as solvent medium in the presence of a peroxidic initiator. A technique of this kind is described in French patent No. 1,590,264, for example.

The invention also pertains to the membranes totally or partially prepared from polymers $P_1$ and/or having all or part of their surfaces or their thicknesses being polymers $P_1$. In other words, for preparing these membranes it is possible to either start with the polymer $P_1$ or with the polymers $P_2$ or $P_3$ and, on the appropriate membrane, transform the polymers $P_2$ or $P_3$ into polymer $P_1$. We may also form the membrane through colaminage of two films, of which one of them at least contains the polymer $P_1$, at least in the final stage of production. As illustrative of the structures of membranes conform to the invention there are in particular:

membranes, monolayer but asymmetrical, constituted of polymers $P_3$ transformed on one face into polymers $P_1$, these polymers $P_1$ and $P_3$ containing some sets of formula II, in particular on the face opposed to the above mentioned face $P_1$, and some sets of formula IV;

membranes obtained through colaminage of two polymers $P_3$, one of them being transformed into polymer $P_1$, one and/or the other polymers containing some sets of formula II and/or sets of formula IV;

The techniques for producing membranes, through extrusion of a film and eventually colaminage are known and are not the subject of this invention. Generally speaking, the membranes conforming to the invention present a thickness of between 200 and 300μ, these values being given as indications only, the thickness may reach from 10μ to 1 mm, the thickness of the layer constituted by the polymer $P_1$ may go from 5 to 50μ. If necessary, the membranes may be strengthened by incorporation of a woven or non-woven material which may be fibers of fluorinated polymer, asbestos fibers or carbon fibers.

The membrane conforming to the invention may be used in cells for electrolysis of various substances and in particular of aqueous solutions of alkaline halogens. Such membranes present improved mechanical properties and keep their high level of performance under a strong density of current and this for a long period of operation.

The following examples will illustrate the invention.

EXAMPLE 1

(a) Terpolymerization is effected under the conditions provided for in French patent No. 1,590,264 with trifluoro-1,1,2 tricholoro-1,2,2 ethane and in the presence of peroxide of bis(perfluoropropionyl):
9.5 moles of tetrafluoroethylene
0.2 mole of fluoride of perfluoro dioxa-3,6 methyly-4 octen-7 sulfonyl [$CF_2$=$CFOCF_2CF(CF_3)OCF_2CF_2SO_2F$]

0.8 mole of perfluoro oxa-6 octen-7 oate of methyl ($CF_2$=$CFOCF_2CF_2CF_2CF_2COOCH_3$).

The polymer obtained is transformed in a film 250μ thick. We measure by the method of Attenuated Total Reflection (ATR) the height of the peaks —$SO_2F$ (1460 cm$^{-1}$) and —$COOCH_3$ (1780 cm$^{-1}$).

(b) The film is hydrolized in NaOH 120 g/l/$CH_3OH$ 40% at 90° C. for 16 hours. The membrane is washed in water and dried under vacuum at 50° C. for 16 hours. The membrane is immersed in $SOCl_2$ at 80° C. for 10 hours (conversion of —COONa groupings in —COCl groupings, verified by the ATR method characteristic peak at 1810 cm$^{-1}$).

(c) The membrane is placed in a polytetrafluoroethylene reactor, one surface of the membrane being placed in contact with a solution in methanol of 0.42 g of sodium peroxide and 20 g of water at −15° C. for one hour. After taking it out of the reactor, the membrane is washed with cold water, the temperature is progressively raised to 40° C. and the membrane is kept at 40° C. for 2 hours in a nitrogenous atmosphere. The membrane is immersed in methanol containing HCl to convert the residual COCl and COOH groupings in $COOCH_3$. The ATR analysis shows a substantial diminution of the peak of the $COOCH_3$ group.

(d) The membrane is hydrolyzed in NaOH 120 g/l—$CH_3OH$ 40% at 90° C. for 8 hours. An examination by microscope of the section of the membrane shows that the layer containing the polymer P$_1$ is about 25 μ.

(e) The polymer constituting the aforementioned layer of 25μ has an equivalent weight of 1,100 and the following distribution of sets (in moles):

0.04 mole of sets I wher T represents the a single bond, w=2, q=4 and p=0.
0.2 mole of sets II
0.72 mole of sets III
7.41 moles of sets IV (f) The membrane is set in a cell of electroylsis, the treated surface facing the cathode and the electrolysis of sodium chloride in performed under the following condition:

Section of the passage of the current in the membrane: 0.5 dm$^2$
Anode made up of a substrate in titanium and comporting a coating of precious metals base
Cathode: perforated plate of nickel
Interpolar distance: 3 mm
Anolyte: fed by an aqueous solution saturated by sodium chloride, the concentration in the anolyte being kept at 200 g/l
Catholyte: aqueous solution of sodium the concentration of which is kept at 450 g/l by adding water.
Density of the current: 30 A/dm$^2$
Temperature in the anodic and cathodic sections; 85° C.
Results:

| Length of passage of current | 24 h | 720 h |
|---|---|---|
| Yield in current | 96% | 96% |
| Voltage | 3.5 V | 3.5 V |

After immersion of the membrane in a solution of sodium at 45% in weight at 90° C. for 8 hours, no degradation of the membrane is noted nor any diminution of the performances during new tests in electrolysis under the afore mentioned conditions.

EXAMPLE 2

(a) Terpolymerization is effected under the conditions provided for in French patent No. 1,590,264 within trifluoro-1,1,2 trichloro-1,2,2 ethane and in the presence of peroxide of bis(perfluoropropionyl):

6.47 moles of tetrafluoroethylene
0.2 mole of fluoride of perfluoro dioxa-3,6, methyl-4 octen-7 sulfonyl [$CF_2$=$CFOCF_2CF(CF_3)OCF_2CF_2CO_2F$]
0.8 mole of perfluoro oxa-6 octen-7 oate of methyl ($CF_2$=$CFOCF_2CF_2CF_2CF_2COOCH_3$).

The polymer obtained is transformed in film 250μ thick. The heights of peaks —$SO_2F$ (1460 cm$^{-1}$) and —$COOCH_3$ (1780 cm$^{31\ 1}$) are measured by the ATR method.

(b) The film is hydrolyzed in NaOH 120 g/l/$CH_3OH$ 40% at 90° C. during 16 hours. The membrane is washed in water and dried under vacuum at 50° C. for 16 of —COONa groupings in COCl groupings, verified by the ATR method-characteristic peaks at 1810 cm$^{-1}$).

(c) The above film is soaked for 10 hours at 80° C. in dichloride of the dioecious perfluorobutane acid.

(d) After superficial drying membrane is placed into a polytetrafluoroethylene reactor, one surface of the membrane being placed in contact with a solution in methanol of 0.42 g of sodium peroxide and 20 g of water for one hour at −15° C. After taking it out the reactor, the membrane is washed with cold water, the temperature is progressively raised to 40° C. and the membrane is kept at 40° C. for 2 hours under a nitrogenous atmosphere. The membrane is immersed in methanol containing HCl to convert the residual COCl and COOCH groupings in $COOCH_3$. The ATR analysis shows a substantial diminution of the peak of the $COOCH_3$ group.

(e) The membrane is hydrolyzed in NaOH 120 g/l —$CH_3OH$ 40% in water (in volume) at 90° C. for 8 hours. An examination by microscope of the section of the membrane shows that the layer containing the polymer P$_1$ is about 20μ.

(f) The polymer constituting the aforementioned layer of 20 μ has an equivalent weight of 1,000 (mass in gram of polymer containing one mole of the exchanging group) and the following distribution of sets (in moles):

0.04 mole of sets I in which T represents $-(CF_2)_2-$, w—2, p=0 and q=4
0.2 mole of sets II
0.72 mole of sets III
6.47 moles of sets IV (g) The membrane is set in a cell of electrolysis, the treated surface facing the cathode, electrolysis of the sodium chloride is performed under the following conditions:

section of passage of current in the membrane: 0.5 dm$^2$
anode made up of a substrate in titanium and comporting a coating of precious metals base
cathode: perforated nickel plate
interpolar distance: 3 mm
anolyte: fed with an aqueous solution saturated with sodium chloride, concentration in the anolyte is kept at 200 g/l
catholyte: aqueous solution of sodium the concentration of which is kept at 450 g/l by addition of water
density of current: 30 A/dm$^2$ temperature in the anodic and cathodic sections: 85° C.

Results:

| Length of passage of current | 24 h | 720 h |
|---|---|---|
| Current yield | 95% | 95% |
| Voltage | 3.45 v | 3.45 v |

After immersion of the membrane in a solution of sodium at 45% in weight at 90° C. for 8 hours, no degradation of the membrane is noted nor any diminution of performances during new tests in electrolysis under the aforementioned conditions.

EXAMPLE 3

(a) Terpolymerization is effected under the conditions provided for in the French patent No. 1,590,264 within trifluoro-1,1,2 trichloro-1,2,2 ethane in presence of peroxide of bis(perfluoropropionyl):
  6.47 moles of tetrafluorethylene
  0.2 mole of fluoride of perfluoro dioxa-3,6 methyl-4 octen-7 sulfonyl [CF$_2$=CFOCF$_2$CF(CF$_3$)OCF$_2$CF$_2$SO$_2$F]
  0.8 mole of perfluoro oxa-6 octen-7 oate of methyl (CF$_2$=CFOCF$_2$CF$_2$CF$_2$CF$_2$COOCH3).

The polymer obtained is transformed in film 250μ thick. We measure by the ATR method the heights of the peaks —SO$_2$F (1460 cm$^{-1}$) and —COOCH$_3$ (1780 cm$^{-1}$).

(b) The film is hydrolyzed in NaOH 120 g/l/CH$_3$OH 40% at 90° C. for 16 hours. The membrane is washed in water and dried under vacuum at 50° C. for 16 hours. The membrane is immersed in SOCl$_2$ at 80° C. for 10 hours (conversion of —COONa groupings in —COCl groupings, verified by the ATR method-characteristic peaks at 1810 cm$^{-1}$).

(c) The above film is soaked for 10 hours at 80° C. in dichloride of the dioecious perfluorobutane acid.

(d) After superficial drying the membrane is placed into a polytetrafluoroethylene reactor, one surface of the membrane being placed in contact with a solution in the methanol of 0.42 g of sodium peroxide and 20 g of water at −15° C. for one hour. The membrane is washed with cold water after being taken out of the reactor, the temperature is progressively raised to 40° C. and the membrane is kept at 40° C. for 2 hours in a nitrogenous atmosphere. The membrane is immersed in methanol containing HCl to convert the residual COCl and COOH groupings in COOCH$_3$. The ATR analysis shows a substantial diminution of the peak of the COOCH$_3$ group.

(e) The membrane is hydrolyzed in NaOH 120 g/l —CH$_3$OH 40% in water (in volume) at 90° C. for 8 hours. The microscopic examination of the section of the membrane shows that the layer containing the polymer P$_1$ is abour 20μ.

(f) The polymer constituting the aforementioned layer of 20 μ has an equivalent weight of 1000 (mass in gram of polymer containing one mole of the exchanging group) and the following distribution of sets (in moles):
  0.04 mole of sets I in which T represents:

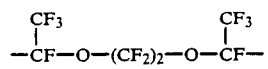

and =0 and q=4

0.2 mole of sets II
0.72 mole of sets III
6.47 moles of sets IV (g) The membrane is set in a cell of electrolysis, the treated surface facing the cathode and the electrolysis of sodium chloride is performed under the following conditions:
  section of passage of current in the membrane: 0.5 dm$^2$
  anode made up of a substrate in titanium and comporting a coating of precious metals base
  cathode: perforated nickel plate
  interpolar distance: 3 mm
  anolyte: fed with an aqueous solution saturated with sodium chloride, the concentration in the anolyte being kept at 200 g/l
  catholyte: aqueous solution of sodium the concentration of which is kept at 450 g/l by addition of water
  current density: 30 A/dm$^2$
  temperature in the anodic and cathodic sections: 85° C.

Results:

| Length of passage of the current | 24 h | 720 h |
|---|---|---|
| Current yield | 95% | 95% |
| Voltage | 3.45 v | 3.45 v |

After immersion of the membrane in a solution of sodium at 45% in weight at 90° C. for 8 hours, no degradation of the membrane is noted, nor any diminution of performances during new tests in electrolysis under the aforementioned conditions.

We claim:

1. A fluorinated ionic polymer consisting essentially of a macromolecular chain comprising at least one set of formula:

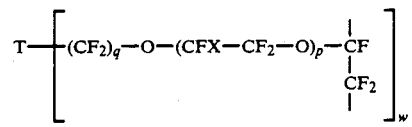

and sets of at least one of formula II and formula III

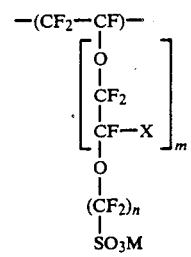

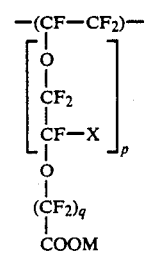

in which:
 w is at least equal to 2 and lower than 10
 m and p, which may be different from one set to another may have values from 0 up to 3 included
 n and q, which may be different from one set to another may have values from 1 up to 6 included
 M represents an atom of hydrogen or a monovalent cation
 X represents an atom of fluorine or a perfluorinated alkyl grouping containing up to 10 carbon atoms
 T represents a prefluorinated chain of formula $$-(CFX_1O)_{r3}-(CF_2CFX_1O)_{r1}-W-(OCFX_1CF_2)_{r2}-(OCFX_1)_{r4}$$

in which:
 $X_1$ represents X or a perfluorinated alkyl grouping having up to 10 carbon atoms and bearing at least one of sulfonic and carboxylic functions
 W represents a perfluorinated, linear or cyclical, radical containing up to 12 carbon atoms
 r1 and r2 may take, individually, a value of 0 up to 3 included
 r3 and r4 may take, individually, the values of 0 or 1.

2. A polymer according to claim 1, further including sets of formula

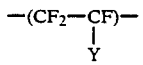    IV in which the symbol Y represents one atom of hydrogen, one atom of chlorine, one atom of fluorine, a perfluorinated alkyl radical or perfluorinated alkoxy containing up to 10 carbon atoms.

3. A polymer according to claim 1, in which said sets are present in such quantities that the equivalent weight of said polymer is between 400 and 10,000.

4. A polymer according to claim 2, in which in the formulas I, II, III and IV, the symbols have the following significances: symbol X represents one atom of fluorine, symbols m and p represent 0 or 1, symbol n represents 2, 3, 4 or 5 and symbol q represents 2, 3, 4 or 5.

5. A polymer according to claim 1, said polymer including sets of formula:

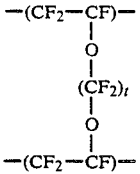  Ia in which t represents a number comprised between 2 and up to 15 included, associated with sets of formula

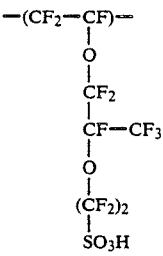

and/or sets of formula

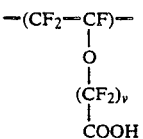  IIIa in which u and v represent individually 2, 3 or 4.

6. A polymer according to claim 1, in which the sets of I and IV are distributed as follows:
 I more than 0 and lower than or equal to 2.75
 II more than or equal to 0 and lower than or equal to 1
 III more than or equal to 0 and lower than or equal to 1
 IV more than or equal to 0 and lower than or equal to 8.08, the sum II+III not being nil.

7. A membrane including a fluorinated ionic polymer according to claim 1.

8. A membrane including a fluorinated ionic polymer according to claim 2.

9. A membrane including a fluorinated ionic polymer according to claim 3.

* * * * *

UNITED STATES PATENT AND TRADEMARK OFFICE
CERTIFICATE OF CORRECTION

PATENT NO.   : 4,981,932

DATED        : January 1, 1991

INVENTOR(S)  : Jean BLAISE et al

It is certified that error appears in the above-identified patent and that said Letters Patent is hereby corrected as shown below:

ON THE TITLE PAGE:

Item [54], "FLUORATED" should read --FLUORINATED--;

Item [30], [DE] Fed. Rep. of Germany, both occurrences, should read --[FR] France--;

Under "OTHER PUBLICATIONS", Kogyo, Dec. 1980." should read --ASAHI KASEI KOGYO, Dec. 1980--;

Item [57], line 1 of the ABSTRACT, "perfluorated" should read --perfluorinated--; last line, "alkalin halogens" should read --brines--;

Column 1, line 1, "FLUORATED" should read --FLUORINATED--.

Signed and Sealed this

Eleventh Day of August, 1992

*Attest:*

DOUGLAS B. COMER

*Attesting Officer*    Acting Commissioner of Patents and Trademarks